United States Patent
Franklin et al.

(10) Patent No.: US 10,920,613 B2
(45) Date of Patent: Feb. 16, 2021

(54) RETENTION SYSTEM FOR IMPROVED FIRE PROTECTION

(71) Applicant: UNITED TECHNOLOGIES CORPORATION, Farmington, CT (US)

(72) Inventors: Jordan J. Franklin, Manchester, CT (US); Joshua W. Sampsell, Middletown, CT (US); Mahesh Gajanan Kavimandan, Hyderabad (IN); Chaitanya Mokkapati, Hyderabad (IN); Satyannarayana Chintapalli, Hyderabad (IN); Sai deepika Vemula, Warangal (IN); Vishnu Murthy Pendum, Medchal (IN); Naveen Prasad Babu Ramireddy Gari, Rocky Hill, CT (US); Naga Pradeep Buddhavarapu, Somersworth, NH (US)

(73) Assignee: Raytheon Technologies Corporation, Farmington, TN (US)

( * ) Notice: Subject to any disclaimer, the term of this patent is extended or adjusted under 35 U.S.C. 154(b) by 148 days.

(21) Appl. No.: 16/165,935

(22) Filed: Oct. 19, 2018

(65) Prior Publication Data
US 2020/0072080 A1 Mar. 5, 2020

(30) Foreign Application Priority Data
Sep. 5, 2018 (IN) .............................. 201811033370

(51) Int. Cl.
*F01D 25/14* (2006.01)

(52) U.S. Cl.
CPC ........ *F01D 25/14* (2013.01); *F05D 2220/323* (2013.01); *F05D 2230/60* (2013.01); *F05D 2240/91* (2013.01); *F05D 2260/20* (2013.01)

(58) Field of Classification Search
CPC .... F01D 25/14; F02C 7/24; F02C 7/25; F23R 3/002; F23R 3/005; A62C 3/08
See application file for complete search history.

(56) References Cited

U.S. PATENT DOCUMENTS

| | | | |
|---|---|---|---|
| 3,779,006 A * | 12/1973 | Lewis | F02C 7/25 60/39.11 |
| 4,207,918 A * | 6/1980 | Burns | F16L 59/168 137/375 |
| 5,336,542 A * | 8/1994 | Wirth | F01D 25/145 428/116 |
| 7,093,666 B2 | 8/2006 | Trumper | |
| 7,232,097 B2 | 6/2007 | Noiseux et al. | |
| 7,927,686 B2 * | 4/2011 | Zielinski | B64D 29/02 428/166 |

(Continued)

*Primary Examiner* — Nathaniel E Wiehe
*Assistant Examiner* — Jackson N Gillenwaters
(74) *Attorney, Agent, or Firm* — Snell & Wilmer L.L.P.

(57) ABSTRACT

A fire protection system for a gas turbine engine is disclosed. In various embodiments, the system includes a first fire blanket wall and a second fire blanket wall, the first fire blanket wall configured for attachment to a first fairing wall and the second fire blanket wall configured for attachment to a second fairing wall, and an attachment system configured to attach the first fire blanket wall to the first fairing wall and the second fire blanket wall to the second fairing wall.

20 Claims, 7 Drawing Sheets

(56) References Cited

U.S. PATENT DOCUMENTS

| | | | |
|---|---|---|---|
| 7,947,354 B2* | 5/2011 | Pirogovsky | B32B 5/245 |
| | | | 428/76 |
| 8,222,165 B2 | 7/2012 | Olver | |
| 8,695,720 B2 | 4/2014 | Mickelsen et al. | |
| 8,844,643 B2 | 9/2014 | Mickelsen et al. | |
| 8,967,958 B2* | 3/2015 | Bajusz | F02C 7/14 |
| | | | 415/178 |
| 2012/0023967 A1 | 2/2012 | DeDe et al. | |
| 2013/0319003 A1 | 12/2013 | Peel | |
| 2013/0327548 A1* | 12/2013 | Cailly | B60P 7/065 |
| | | | 169/43 |
| 2016/0327061 A1* | 11/2016 | Mandel | B29C 65/48 |
| 2017/0363009 A1 | 12/2017 | Ratajac et al. | |
| 2018/0051882 A1* | 2/2018 | Widener | F02C 9/18 |
| 2019/0178106 A1* | 6/2019 | Peace | H02K 5/02 |
| 2020/0025091 A1* | 1/2020 | De Pau, Jr. | F02C 7/18 |

* cited by examiner

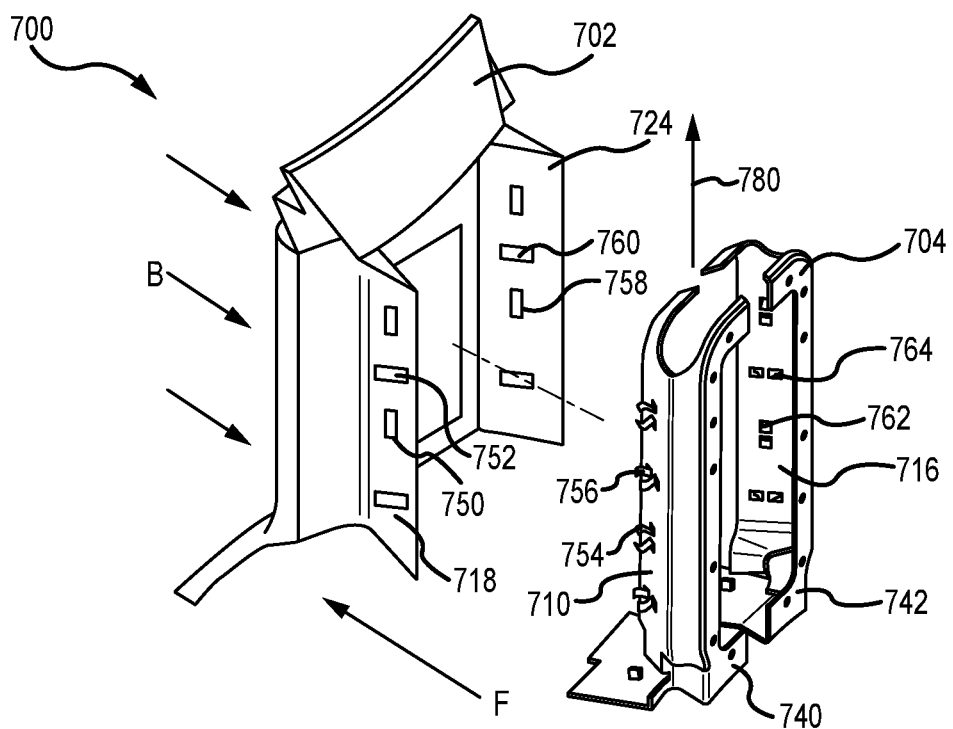
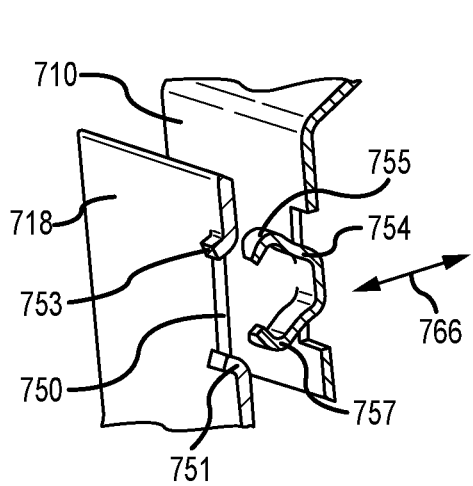
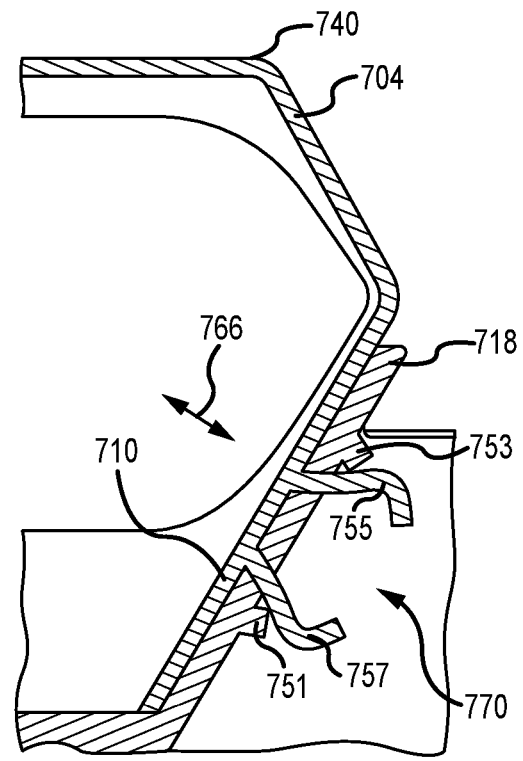
FIG.7A
FIG.7B
FIG.7C

RETENTION SYSTEM FOR IMPROVED FIRE PROTECTION

CROSS-REFERENCE TO RELATED APPLICATIONS

This application claims priority to, and the benefit of, Indian Prov. Pat. Appl., Serial No. 201811033370, entitled "Retention System for Improved Fire Protection," filed on Sep. 5, 2018 at the Indian Patent Office, the entirety of which is incorporated herein for all purposes by this reference.

FIELD

The present disclosure relates to gas turbine engines and, more particularly, to apparatus and methods used to protect components within gas turbine engines from damage due to fire.

BACKGROUND

Gas turbine engines, such as those that power modern commercial and military aircraft, include a fan section to propel the aircraft, a compressor section to pressurize a supply of air, a combustor section to burn a hydrocarbon fuel in the presence of the pressurized air, and a turbine section to extract energy from the resultant combustion gases in order to power the compressor and fan section.

Regulatory requirements for modern aircraft require the containment of a fire within a power plant installation, such as a gas turbine engine used for propulsion. For instance, if a fire is present in the engine compartment surrounding the gas turbine engine, the structures defining the engine compartment must meet certain standards related to flame resistance and fire containment. In order to meet requirements relating to fire containment, fire seals are typically used between separate adjacent components defining the engine compartment to seal between them and prevent the spread of fire. The fire seals resist the flames and the environment of the fire, and will contain the fire by not allowing the flames to pass through. Fire blankets can also be employed to protect panels or the various components of a gas turbine engine.

SUMMARY

A fire protection system for a gas turbine engine is disclosed. In various embodiments, the system includes a first fire blanket wall and a second fire blanket wall, the first fire blanket wall configured for attachment to a first fairing wall and the second fire blanket wall configured for attachment to a second fairing wall; and an attachment system configured to attach the first fire blanket wall to the first fairing wall and the second fire blanket wall to the second fairing wall.

In various embodiments, the attachment system comprises a hook and loop system. In various embodiments, the hook and loop system includes: a first hook strap attached to a first inner surface of the first fairing wall and a first loop strap attached to a first outer surface of the first fire blanket wall, the first loop strap configured to engage the first hook strap; and a second hook strap attached to a second inner surface of the second fairing wall and a second loop strap attached to a second outer surface of the second fire blanket wall, the second loop strap configured to engage the second hook strap.

In various embodiments, the attachment system comprises a slot and wedge system. In various embodiments, the slot and wedge system includes: a first slot positioned at a first inner surface of the first fairing wall and a first wedge attached to a first outer surface of the first fire blanket wall, the first wedge configured to engage the first slot; and a second slot positioned at a second inner surface of the second fairing wall and a second wedge attached to a second outer surface of the second fire blanket wall, the second wedge configured to engage the second slot.

In various embodiments, the attachment system comprises a protrusion and hole system. In various embodiments, the protrusion and hole system includes: a first hole positioned at a first inner surface of the first fairing wall and a first protrusion attached to a first outer surface of the first fire blanket wall, the first protrusion configured to engage the first hole; and a second hole positioned at a second inner surface of the second fairing wall and a second protrusion attached to a second outer surface of the second fire blanket wall, the second protrusion configured to engage the second hole.

In various embodiments, the attachment system comprises a hook and hole system. In various embodiments, the hook and hole system includes: a first hole positioned at a first inner surface of the first fairing wall and a first hook attached to a first outer surface of the first fire blanket wall, the first hook configured to engage the first hole; and a second hole positioned at a second inner surface of the second fairing wall and a second hook attached to a second outer surface of the second fire blanket wall, the second hook configured to engage the second hole. In various embodiments, the first hole is a first vertical-hole or a first horizontal-hole and the second hole is a second vertical-hole or second horizontal-hole and the first hook has a first pair of arms and the second hook has a second pair of arms.

A fire protection system for use with a heat exchanger within a nacelle of a gas turbine engine is disclosed. In various embodiments, the system includes a fire blanket having a first end configured for attachment to a fairing and a second end configured for attachment to a duct interconnecting the fairing and the heat exchanger, the fire blanket having a first fire blanket wall and a second fire blanket wall, the first fire blanket wall configured for attachment with a first fairing wall of the fairing and the second fire blanket wall configured for attachment with a second fairing wall of the fairing; and an attachment system configured to attach the first fire blanket wall to the first fairing wall and the second fire blanket wall to the second fairing wall. In various embodiments, the attachment system comprises a hook and loop system. In various embodiments, the attachment system comprises a slot and wedge system. In various embodiments, the attachment system comprises a protrusion and hole system. In various embodiments, the attachment system comprises a hook and hole system.

A gas turbine engine is disclosed. In various embodiments, the gas turbine engine includes a nacelle defining a bypass flow path between a radially outer nacelle casing and a radially inner nacelle casing; a heat exchanger disposed within the bypass flow path; a fire blanket disposed within the bypass flow path, the fire blanket having a first end configured for attachment to a fairing and a second end configured for attachment to a duct interconnecting the fairing and the heat exchanger, the fire blanket having a first fire blanket wall and a second fire blanket wall, the first fire blanket wall configured for attachment with a first fairing wall of the fairing and the second fire blanket wall configured for attachment with a second fairing wall of the fairing;

and an attachment system configured to attach the first fire blanket wall to the first fairing wall and the second fire blanket wall to the second fairing wall. In various embodiments, the attachment system comprises a hook and loop system. In various embodiments, the attachment system comprises a slot and wedge system. In various embodiments, the attachment system comprises a protrusion and hole system. In various embodiments, the attachment system comprises a hook and hole system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 7A, 7B and 7C are exploded, perspective and cross sectional schematic views of a fire protection system, in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
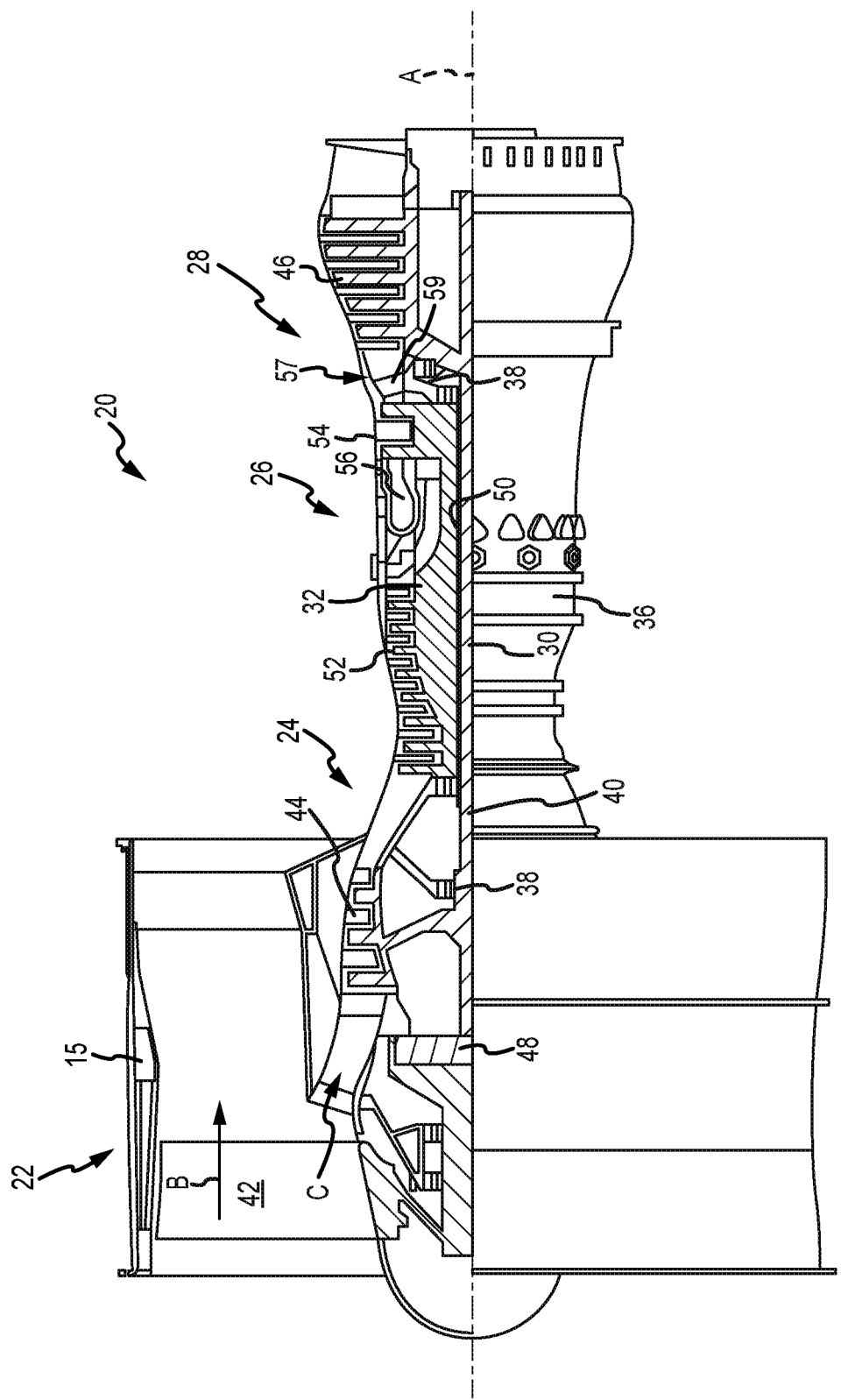
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a fan case 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans, as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2:
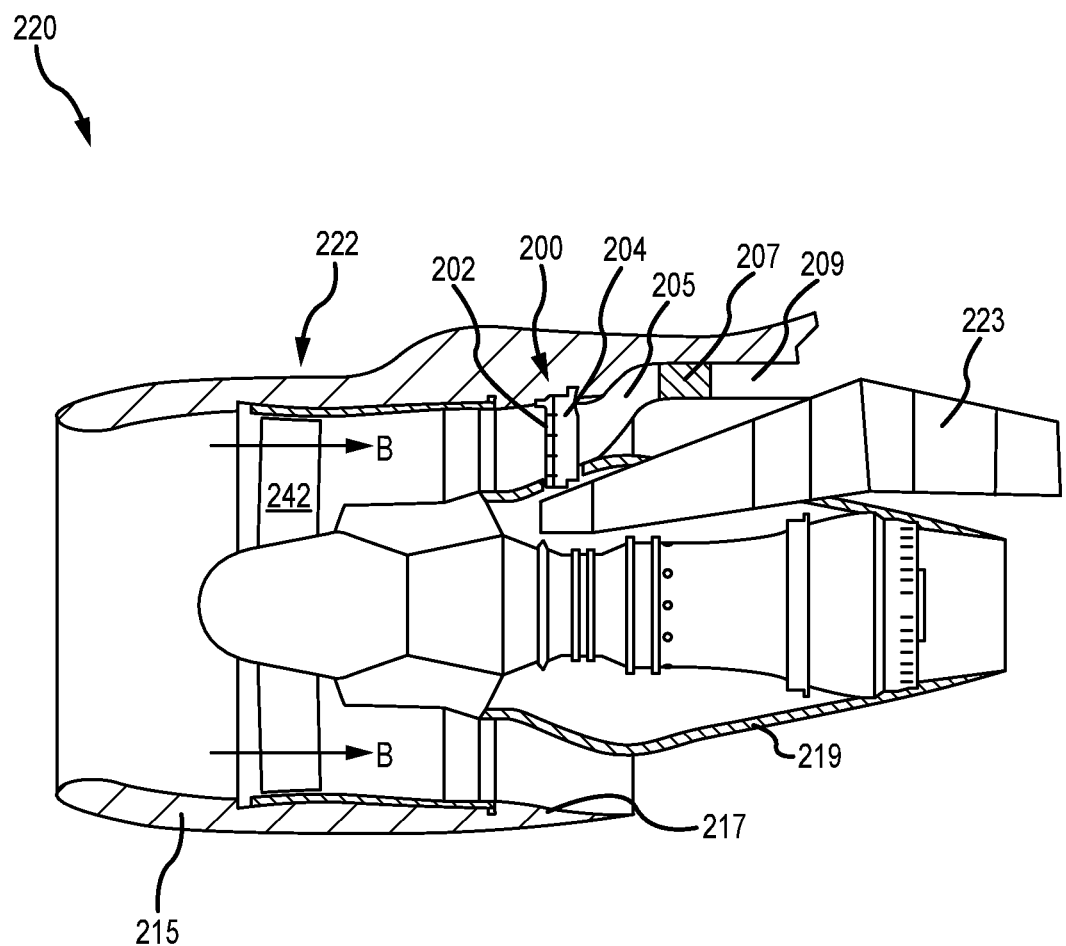
FIG. 2 is a cross sectional schematic view of a gas turbine engine having a fire protection system, in accordance with various embodiments.

Referring now to FIG. 2, a gas turbine engine 220, such as, for example, the gas turbine engine 20 described above with reference to FIG. 1, is illustrated. Similar to the above description, the gas turbine engine 220 includes a nacelle 215 that houses a fan section 222. Similar to the above description, the fan section 222 includes a fan 242 that drives air along a bypass flow path B in a bypass duct defined within a nacelle 215. A pylon 223 may be configured to connect the gas turbine engine 220 to, for example, the underside of a wing of an aircraft. In various embodiments, the gas turbine engine 220 includes a fire protection system 200 for an engine component or heat exchanger. In various embodiments, the fire protection system 200 may include a fairing 202 (or inlet) and a fire blanket 204. In various embodiments, a portion of the air flowing within the bypass flow path B is directed into the fairing 202 of the fire protection system 200, through an opening in the fire blanket 204 and then into a duct 205 downstream of the fire protection system 200. The air flowing through the duct 205 is then passed through a heat exchanger 207, where the air can be used to cool, for example, oil or fuel being transported by tubes. In various embodiments, upon exiting the heat exchanger 207, the air then exits an aft end of the nacelle 215, together with the rest of the air flowing through the bypass flow path B.

Figure 3A:
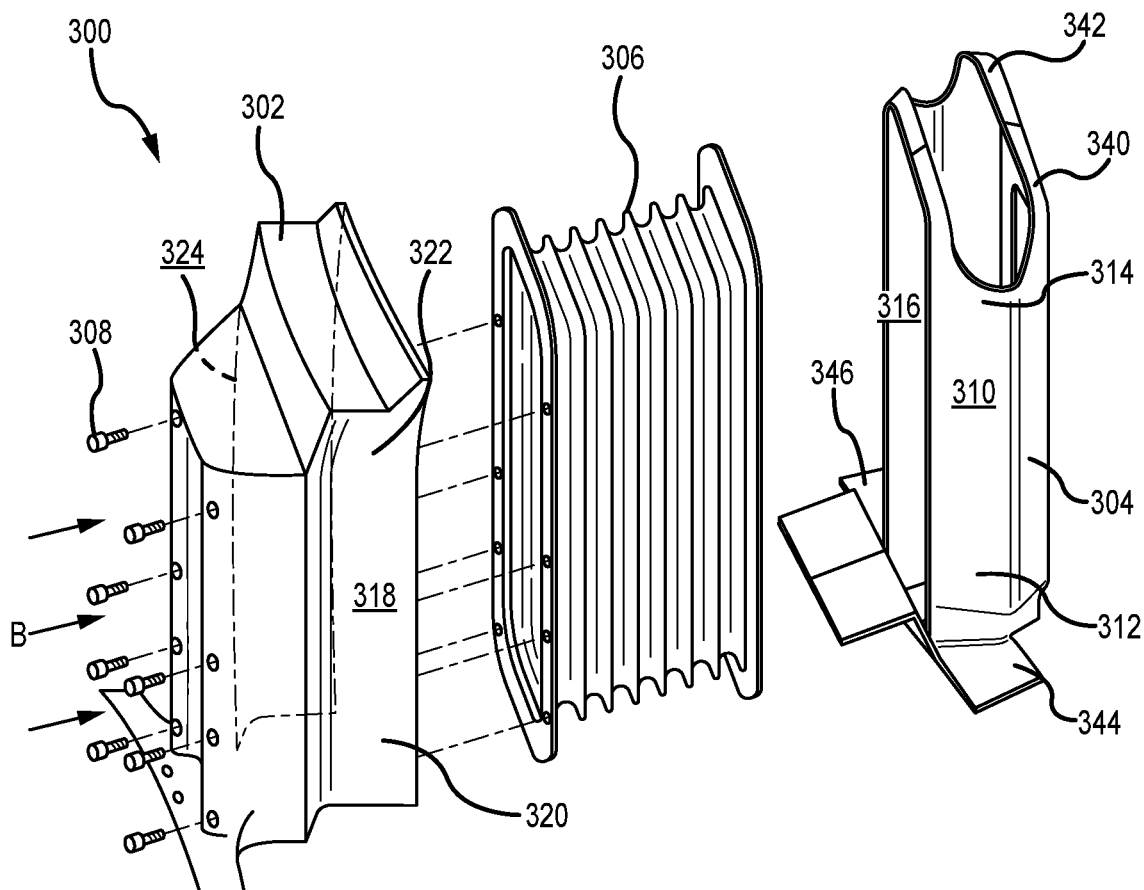
FIGS. 3A and 3B are exploded and assembled perspective schematic views of a fire protection system, in accordance with various embodiments.
Figure 3B:
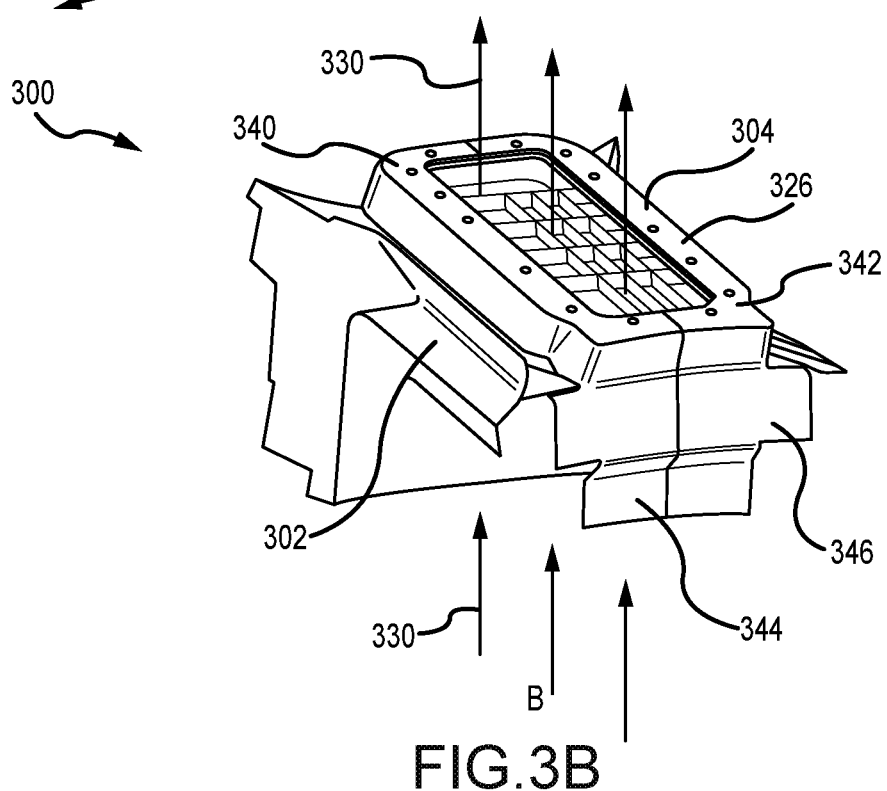

Referring now to FIGS. 3A and 3B, exploded and assembled perspective views of a fire protection system 300 are provided, in accordance with various embodiments. Referring to FIG. 3A, the fire protection system 300 includes a fairing 302, a fire blanket 304 and a bellows 306, the bellows 306 being configured for disposition between the fairing 302 and the fire blanket 304. In various embodiments, the fairing 302 is oriented in a forward direction F and may function as an inlet for air flowing through a bypass flow path B, such as, for example, the bypass flow path B, described above with reference to FIGS. 1 and 2. The fairing 302 may also function as a frame for the fire protection system 300. In various embodiments, the bellows 306 may be attached to the fairing 302 using one or more bolts 308. In various embodiments, one or both of the fairing 302 and the fire blanket 304 may be comprised of unitary monolithic structures or multi-component structures.

In various embodiments, the fire blanket 304 includes a first fire blanket wall 310 that extends from a first fire blanket end 312 to a second fire blanket end 314 of the fire blanket 304. The fire blanket 304 may also include a second fire blanket wall 316 on the opposite side of the fire blanket 304 from the first fire blanket wall 310. The second fire blanket wall 316 may also extend from the first fire blanket end 312 to the second fire blanket end 314 of the fire blanket 304. Similarly, the fairing 302 may include a first fairing wall 318 that extends from a first fairing end 320 to a second fairing end 322 of the fairing 302. The fairing 302 may also include a second fairing wall 324, on the opposite side of the fairing 302 from the first fairing wall 318, that extends from the first fairing end 320 to the second fairing end 322.

In various embodiments, the fire blanket 304 is configured to mate with the fairing 302, with the bellows 306 sandwiched therebetween. In various embodiments, as will be described further below, an outside surface (or first outside surface) of the first fire blanket wall 310 is configured to mate against or proximate an inside surface (or first inside surface) of the first fairing wall 318. Similarly, an outside surface (or second outside surface) of the second fire blanket wall 316 is configured to mate against or proximate an inside surface (or second inside surface) of the second fairing wall 324. When the fairing 302 and the fire blanket 304 are mated as above and herein described, the outside surfaces of the first fire blanket wall 310 and the second fire blanket wall 316 will mate against or proximate the inside surfaces of the first fairing wall 318 and the second fairing wall 324, respectively, as described and illustrated further with reference to FIGS. 4B, 5C, 6C and 7C. Described below are various embodiments of engaging or connecting the first fire blanket wall 310 to the first fairing wall 318 and the second fire blanket wall 316 to the second fairing wall 324, such that the fire blanket 304 is engaged with or connected to the fairing 302.

As illustrated in FIG. 3B, in accordance with various embodiments, once the fire blanket 304 is engaged with or connected to the fairing 302, a passage is established for the flow of a bypass stream 330 from the bypass flow path B, from a forward facing end of the fairing 302, through the bellows 306, to an aft facing end of the fire blanket 304. In various embodiments, the fire blanket 304 includes an aft face 326 that provides a platform for mounting a duct configured to carry air in the bypass stream 330 to a heat exchanger, such as the duct 205 and the heat exchanger 207 described above with reference to FIG. 2. In various embodiments, the fire blanket 304 includes a first portion 340 or first half and a second portion 342 or second half. In various embodiments, the first portion 340 includes a first base member 344 and the second portion 342 includes a second base member 346. In various embodiments, the first base member 344 and the second base member 346 are configured to connect to an outer engine casing structure to support the fire protection system 300 within a nacelle structure of an engine.

Figure 4A:
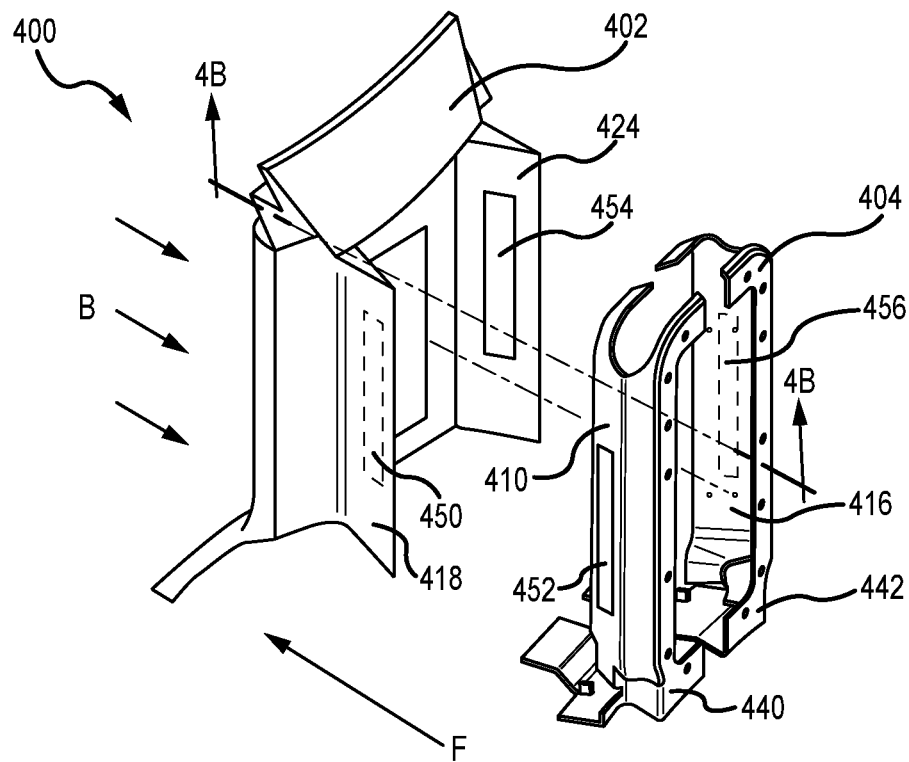
FIGS. 4A and 4B are exploded and cross sectional schematic views of a fire protection system, in accordance with various embodiments.
Figure 4B:
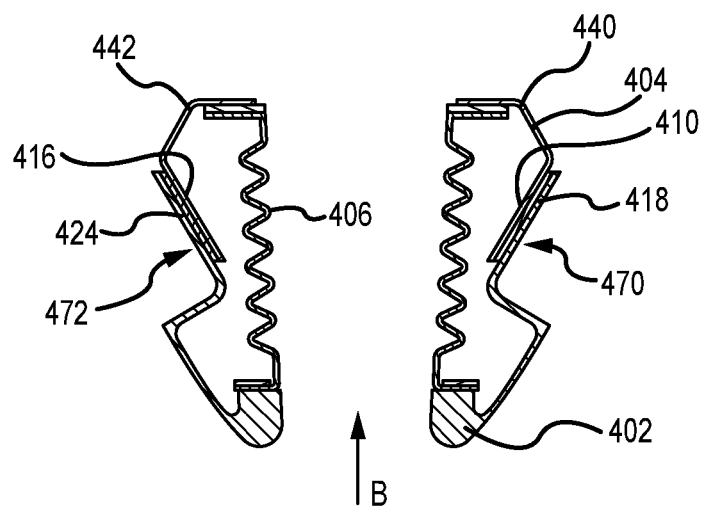

Referring now to FIGS. 4A and 4B, a fire protection system 400 is illustrated, in accordance with various embodiments. The fire protection system 400 includes a fairing 402, a fire blanket 404 and a bellows 406 configured for disposition between the fairing 402 and the fire blanket 404. In various embodiments, the fairing 402 is oriented in a forward direction F and may function as an inlet for air flowing through a bypass flow path B, such as, for example, the bypass flow path B, described above with reference to FIGS. 1 and 2. The fairing 402 may also function as a frame for the fire protection system 400. In various embodiments, the fire blanket 404 includes a first fire blanket wall 410 and a second fire blanket wall 416 on the opposite side of the fire blanket 404 from the first fire blanket wall 410. Similarly, the fairing 402 may include a first fairing wall 418 and a second fairing wall 424 on the opposite side of the fairing 402 from the first fairing wall 418. In various embodiments, the fire blanket 404 includes a first portion 440 or first half and a second portion 442 or second half Similar to the fire protection system 300 described above with reference to FIGS. 3A and 3B, in various embodiments, the fire blanket 404 is configured to mate with the fairing 402, with the bellows 406 sandwiched therebetween. In various embodiments, an outside surface of the first fire blanket wall 410 is configured to mate against or proximate an inside surface of the first fairing wall 418. Similarly, an outside surface of the second fire blanket wall 416 is configured to mate against or proximate an inside surface of the second fairing wall 424. In various embodiments, the fire blanket 404 is secured to the fairing 402 using an attachment system, such as, for example, a VELCRO® Brand hook and loop system. In various embodiments, for example, a first hook strap 450 is attached to the inner surface of the first fairing wall 418 and a first loop strap 452 is attached to outer surface of the first fire blanket wall 410. Similarly, a second hook strap 454 is attached to the inner surface of the second fairing wall 424 and a second loop strap 456 is attached to the outer surface of the second fire blanket wall 416. With the fairing 402 and the fire blanket 404 mated together, the first hook strap 450 and the first loop strap 452 engage one another to form a first wall lock 470, while the second hook strap 454 and the second loop strap 456 engage one another to form a second wall lock 472.

In various embodiments, the fire blanket 404 is attached to the fairing 402 as an integral, monolithic (one-piece) unit. In various embodiments, the fire blanket 404 is attached to the fairing 402 as a multi-piece unit, such as, for example, a two-piece unit comprising the first portion 440 or first half and the second portion 442 or second half. In various embodiments, both the first wall lock 470 and the second wall lock 472 are releasable, enabling the fire blanket 404 to be disassembled from the fairing 402 to affect inspection or repairs to the fire protection system 400 as required. In various embodiments, the locations of the hook straps and the loop straps are reversed, such that, for example, the hook straps are attached to the outer surfaces of the fire blanket walls and the loop straps are attached to the inner surfaces of the fairing walls.

Figure 5A:
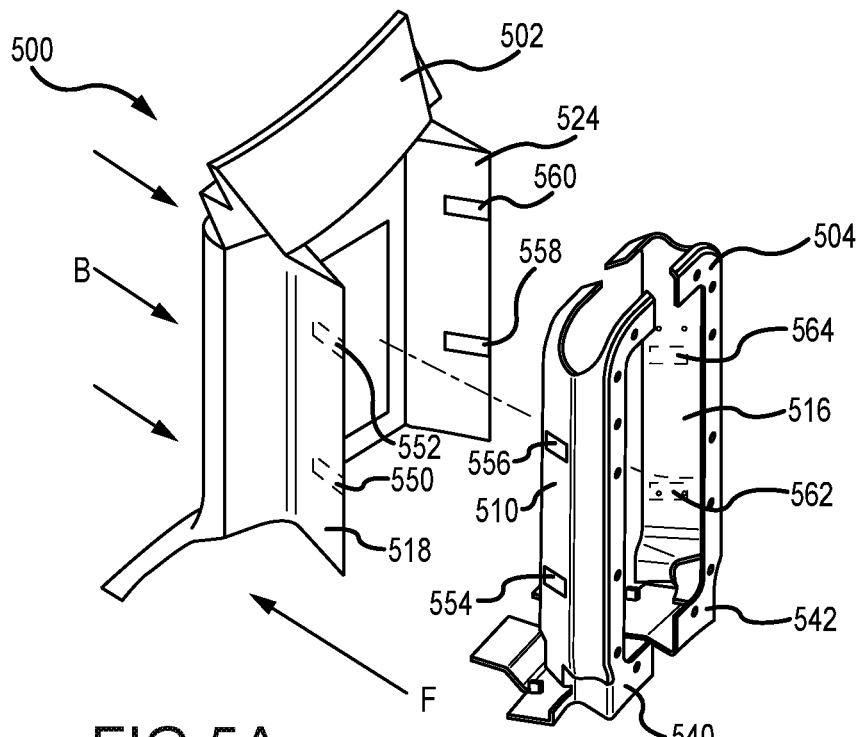
FIGS. 5A, 5B and 5C are exploded, perspective and cross sectional schematic views of a fire protection system, in accordance with various embodiments.
Figure 5B:
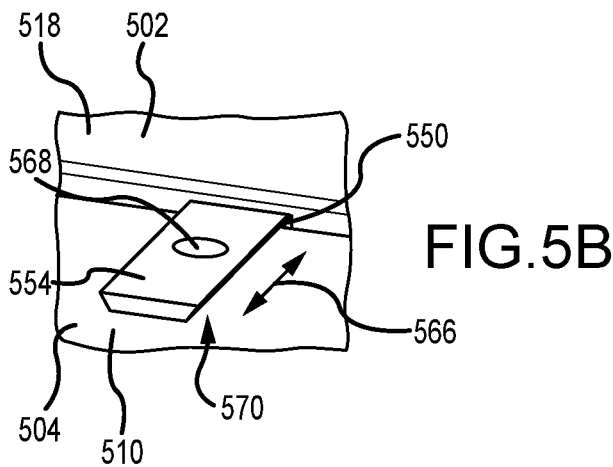
Figure 5C:
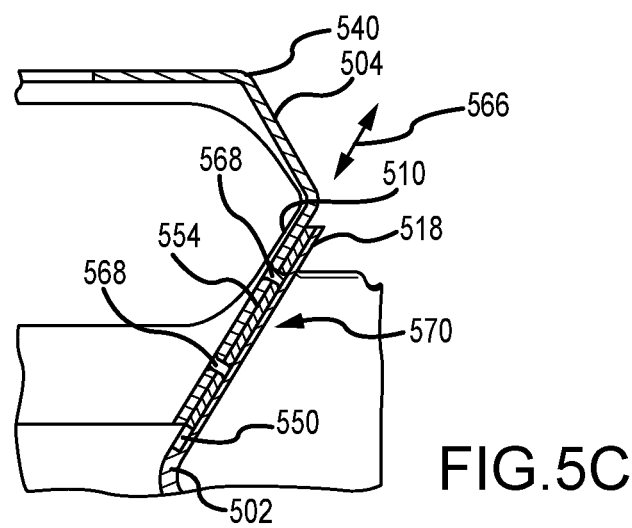

Referring now to FIGS. 5A, 5B and 5C, a fire protection system 500 is illustrated, in accordance with various embodiments. The fire protection system 500 includes a fairing 502, a fire blanket 504 and a bellows (see, e.g., the bellows 406 in FIG. 4B) configured for disposition between the fairing 502 and the fire blanket 504. In various embodiments, the fairing 502 is oriented in a forward direction F and may function as an inlet for air flowing through a bypass flow path B, such as, for example, the bypass flow path B, described above with reference to FIGS. 1 and 2. The fairing 502 may also function as a frame for the fire protection system 500. In various embodiments, the fire blanket 504 includes a first fire blanket wall 510 and a second fire blanket wall 516 on the opposite side of the fire blanket 504 from the first fire blanket wall 510. Similarly, the fairing 502 may include a first fairing wall 518 and a second fairing wall 524 on the opposite side of the fairing 502 from the first fairing wall 518. In various embodiments, the fire blanket 504 includes a first portion 540 or first half and a second portion 542 or second half.

Similar to the fire protection system 300 described above with reference to FIGS. 3A and 3B, in various embodiments, the fire blanket 504 is configured to mate with the fairing 502, with the bellows sandwiched therebetween. In various embodiments, an outside surface of the first fire blanket wall 510 is configured to mate against or proximate an inside surface of the first fairing wall 518. Similarly, an outside surface of the second fire blanket wall 516 is configured to mate against or proximate an inside surface of the second fairing wall 524. In various embodiments, the fire blanket 504 is secured to the fairing 502 using an attachment system, such as, for example, a slot and wedge system. In various embodiments, for example, a first lower slot 550 and a first upper slot 552 are positioned at the inner surface of the first fairing wall 518 and a first lower wedge 554 and a first upper wedge 556 are attached to the outer surface of the first fire blanket wall 510. Similarly, a second lower slot 558 and a second upper slot 560 are positioned at the inner surface of the second fairing wall 524 and a second lower wedge 562 and a second upper wedge 564 are attached to the outer surface of the second fire blanket wall 516.

As illustrated in FIGS. 5B and 5C, when assembling the fire protection system 500, the wedges, such as, for example, the first lower wedge 554, are slid into the slots, such as, for example, the first lower slot 550, along a sliding direction 566, which, in various embodiments, may be reversed for disassembly. With the fairing 502 and the fire blanket 504 mated together, the first lower slot 550 and the first upper slot 552 engage the first lower wedge 554 and the first upper wedge 556 to form a first wall lock 570, while the second lower slot 558 and the second upper slot 560 engage the second lower wedge 562 and the second upper wedge 564 to form a second wall lock. In various embodiments, one or more rivets 568 may be used to secure the wedges to the fire blanket walls.

In various embodiments, the fire blanket 504 is attached to the fairing 502 as an integral, monolithic (one-piece) unit. In various embodiments, the fire blanket 504 is attached to the fairing 502 as a multi-piece unit, such as, for example, a two-piece unit comprising the first portion 540 or first half and the second portion 542 or second half. In various embodiments, both the first wall lock 570 and the second wall lock are releasable, enabling the fire blanket 504 to be disassembled from the fairing 502 to affect inspection or repairs to the fire protection system 500 as required. In various embodiments, the locations of the wedges and the slots are reversed, such that, for example, the slots are positioned at the outer surfaces of the fire blanket walls and the wedges are attached to the inner surfaces of the fairing walls.

Figure 6A:
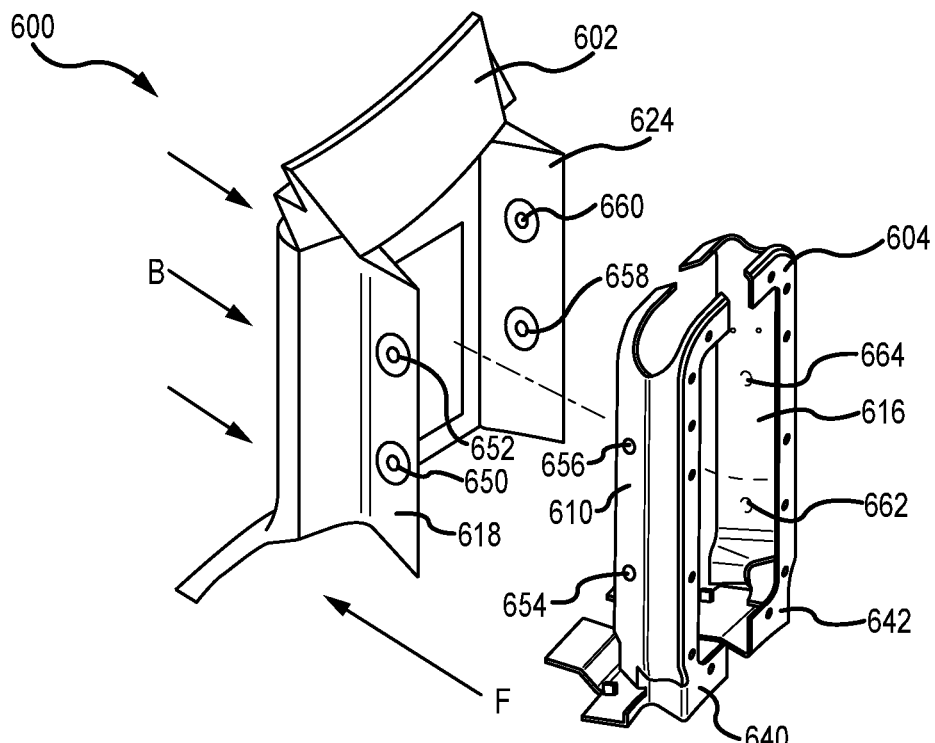
FIGS. 6A, 6B and 6C are exploded and cross sectional schematic views of a fire protection system, in accordance with various embodiments.
Figure 6B:
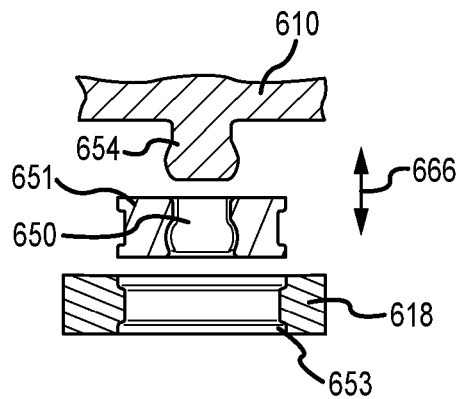
Figure 6C:
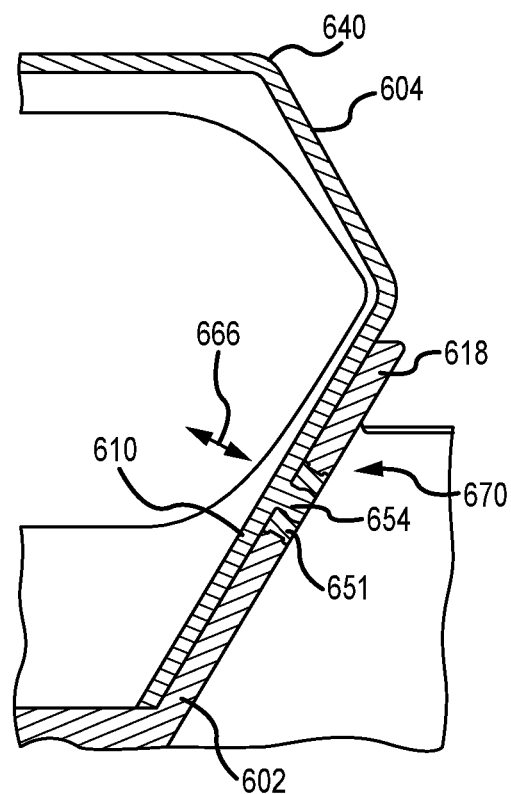

Referring now to FIGS. 6A, 6B and 6C, a fire protection system 600 is illustrated, in accordance with various embodiments. The fire protection system 600 includes a fairing 602, a fire blanket 604 and a bellows (see, e.g., the bellows 406 in FIG. 4B) configured for disposition between the fairing 602 and the fire blanket 604. In various embodiments, the fairing 602 is oriented in a forward direction F and may function as an inlet for air flowing through a bypass flow path B, such as, for example, the bypass flow path B, described above with reference to FIGS. 1 and 2. The fairing 602 may also function as a frame for the fire protection system 600. In various embodiments, the fire blanket 604 includes a first fire blanket wall 610 and a second fire blanket wall 616 on the opposite side of the fire blanket 604 from the first fire blanket wall 610. Similarly, the fairing 602 may include a first fairing wall 618 and a second fairing wall 624 on the opposite side of the fairing 602 from the first fairing wall 618. In various embodiments, the fire blanket 604 includes a first portion 640 or first half and a second portion 642 or second half.

Similar to the fire protection system 300 described above with reference to FIGS. 3A and 3B, in various embodiments, the fire blanket 504 is configured to mate with the fairing 602, with the bellows sandwiched therebetween. In various embodiments, an outside surface of the first fire blanket wall 610 is configured to mate against or proximate an inside surface of the first fairing wall 618. Similarly, an outside surface of the second fire blanket wall 616 is configured to mate against or proximate an inside surface of the second fairing wall 624. In various embodiments, the fire blanket 604 is secured to the fairing 602 using an attachment system, such as, for example, a protrusion and hole system. In various embodiments, for example, a first lower hole 650 and a first upper hole 652 are positioned at the inner surface of the first fairing wall 618 and a first lower protrusion 654 and a first upper protrusion 656 are attached to the outer surface of the first fire blanket wall 610. Similarly, a second lower hole 658 and a second upper hole 660 are positioned at the inner surface of the second fairing wall 624 and a second lower protrusion 662 and a second upper protrusion 664 are attached to the outer surface of the second fire blanket wall 616.

As illustrated in FIGS. 6B and 6C, when assembling the fire protection system 600, the protrusions, such as, for example, the first lower protrusion 654, are slid into the holes, such as, for example, the first lower hole 650, along a sliding direction 666, which, in various embodiments, may be reversed for disassembly. With the fairing 602 and the fire blanket 604 mated together, the first lower hole 650 and the first upper hole 652 engage the first lower protrusion 654 and the first upper protrusion 656 to form a first wall lock 670, while the second lower hole 658 and the second upper hole 660 engage the second lower protrusion 662 and the second upper protrusion 664 to form a second wall lock. In various embodiments, the holes, such as, for example, the first lower hole 650, may be formed through use of an insert or a busing positioned within an aperture, such as, for example, the insert or the busing 651 positioned into an aperture 653 of the first fairing wall 618, the outer surface of the insert or the busing 651 and the inner surface of the aperture 653 being configured to maintain the insert or the busing 651 within the aperture 653 during engagement of the first lower protrusion 654 and the first lower hole 650.

In various embodiments, the fire blanket 604 is attached to the fairing 602 as an integral, monolithic (one-piece) unit. In various embodiments, the fire blanket 604 is attached to the fairing 602 as a multi-piece unit, such as, for example, a two-piece unit comprising the first portion 640 or first half and the second portion 642 or second half. In various embodiments, both the first wall lock 670 and the second wall lock are releasable, enabling the fire blanket 604 to be disassembled from the fairing 602 to affect inspection or repairs to the fire protection system 600 as required. In various embodiments, the locations of the holes and the protrusions are reversed, such that, for example, the holes are positioned at the outer surfaces of the fire blanket walls and the protrusions are attached to the inner surfaces of the fairing walls.

Referring now to FIGS. 7A, 7B and 7C, a fire protection system 700 is illustrated, in accordance with various embodiments. The fire protection system 700 includes a fairing 702, a fire blanket 704 and a bellows (see, e.g., the bellows 406 in FIG. 4B) configured for disposition between the fairing 702 and the fire blanket 704. In various embodiments, the fairing 702 is oriented in a forward direction F and may function as an inlet for air flowing through a bypass flow path B, such as, for example, the bypass flow path B, described above with reference to FIGS. 1 and 2. The fairing 702 may also function as a frame for the fire protection system 700. In various embodiments, the fire blanket 704 includes a first fire blanket wall 710 and a second fire blanket wall 716 on the opposite side of the fire blanket 704 from the first fire blanket wall 710. Similarly, the fairing 702 may include a first fairing wall 718 and a second fairing wall 724 on the opposite side of the fairing 702 from the first fairing wall 718. In various embodiments, the fire blanket 704 includes a first portion 740 or first half and a second portion 742 or second half.

Similar to the fire protection system 300 described above with reference to FIGS. 3A and 3B, in various embodiments, the fire blanket 704 is configured to mate with the fairing 702, with the bellows sandwiched therebetween. In various embodiments, an outside surface of the first fire blanket wall 710 is configured to mate against or proximate an inside surface of the first fairing wall 718. Similarly, an outside surface of the second fire blanket wall 716 is configured to mate against or proximate an inside surface of the second fairing wall 724. In various embodiments, the fire blanket 704 is secured to the fairing 702 using an attachment system, such as, for example, a hook and hole system. In various embodiments, for example, a first vertical hole 750 and a first horizontal hole 752 are positioned at the inner surface of the first fairing wall 718 and a first vertical hook-pair 754 and a first horizontal hook-pair 756 are attached to the outer surface of the first fire blanket wall 710. Similarly, a second vertical hole 758 and a second horizontal hole 760 are positioned at the inner surface of the second fairing wall 724 and a second vertical hook-pair 762 and a second horizontal hook-pair 764 are attached to the outer surface of the second fire blanket wall 716. In various embodiments, the reference to vertical and horizontal is with respect to an axis 780 extending lengthwise along the fairing and the fire blanket walls.

As illustrated in FIGS. 7B and 7C, when assembling the fire protection system 700, the hook-pairs, such as, for example, the first vertical hook-pair 754, are slid into the holes, such as, for example, the first vertical hole 750, along a sliding direction 766, which, in various embodiments, may be reversed for disassembly. With the fairing 702 and the fire blanket 704 mated together, the first vertical hole 750 and the first horizontal hole 752 engage the first vertical hook-pair 754 and the first horizontal hook-pair 756 to form a first wall lock 770, while the second vertical hole 758 and the second horizontal hole 760 engage the second vertical hook-pair 762 and the second horizontal hook-pair 764 to form a second wall lock. In various embodiments, the holes, such as, for example, the first vertical hole 750, may be formed by a drill or punch extending through the first fairing wall 718. In various embodiments, the holes, such as, for example, the first vertical hole 750, are formed to include a first ear 751 and a second ear 753 extending outward of the hole. In various embodiments, the hook-pairs, such as, for example, the first vertical hook-pair 754, may be formed by first cutting and then bending a first arm 757 and a second arm 755 outward from the material comprising the first fire blanket wall 710. In various embodiments, distal ends of the first arm 757 and the second arm 755 may be curved inward toward each other so as to provide a smooth surface to slide past and lock against the first ear 751 and the second ear 753 during and following assembly or disassembly.

In various embodiments, the fire blanket 704 is attached to the fairing 702 as an integral, monolithic (one-piece) unit. In various embodiments, the fire blanket 704 is attached to the fairing 702 as a multi-piece unit, such as, for example, a two-piece unit comprising the first portion 740 or first half and the second portion 742 or second half. In various embodiments, both the first wall lock 770 and the second wall lock are releasable, enabling the fire blanket 704 to be disassembled from the fairing 702 to affect inspection or repairs to the fire protection system 700 as required. In various embodiments, the locations of the holes and the hook-pairs are reversed, such that, for example, the holes are positioned at the outer surfaces of the fire blanket walls and the hook-pairs are attached to the inner surfaces of the fairing walls. In various embodiments, the holes and hook-pairs are all oriented vertically or all oriented horizontally with respect to the fairing 702 and fire blanket 704. In various embodiments, as described above, some of the holes and hook-pairs are oriented vertically and some are oriented horizontally with respect to the fairing 702 and fire blanket 704. In various embodiments, the holes and hook-pairs may be oriented using any other combination of orientations, such as, for example, at forty-five degree (45°) angles, rather than zero degree (0°) (vertical) and ninety degree (90°) (horizontal) angles.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A fire protection system for a gas turbine engine, comprising:
    a fairing having a first fairing wall and a second fairing wall;
    a fire blanket having a first fire blanket wall and a second fire blanket wall, the first fire blanket wall configured for attachment to the first fairing wall and the second fire blanket wall configured for attachment to the second fairing wall;
    a bellows configured for disposition between the fairing and the fire blanket; and
    an attachment system configured to attach the first fire blanket wall to the first fairing wall and the second fire blanket wall to the second fairing wall,
        wherein the fairing, the bellows and the fire blanket, when assembled, are configured to establish a passage for a flow of a bypass stream of the gas turbine engine, from a forward facing end of the fairing, through the bellows, to an aft facing end of the fire blanket and
        wherein the passage is configured such that, during operation, the flow of the bypass stream flows through each of the fairing, the bellows and the fire blanket.

2. The fire protection system of claim 1, wherein the attachment system comprises a hook and loop system.

3. The fire protection system of claim 2, wherein the hook and loop system includes:
    a first hook strap attached to a first inner surface of the first fairing wall and a first loop strap attached to a first outer surface of the first fire blanket wall, the first loop strap configured to engage the first hook strap; and
    a second hook strap attached to a second inner surface of the second fairing wall and a second loop strap attached to a second outer surface of the second fire blanket wall, the second loop strap configured to engage the second hook strap.

4. The fire protection system of claim 1, wherein the attachment system comprises a slot and wedge system.

5. The fire protection system of claim 4, wherein the slot and wedge system includes:
    a first slot positioned at a first inner surface of the first fairing wall and a first wedge attached to a first outer surface of the first fire blanket wall, the first wedge configured to engage the first slot; and
    a second slot positioned at a second inner surface of the second fairing wall and a second wedge attached to a second outer surface of the second fire blanket wall, the second wedge configured to engage the second slot.

6. The fire protection system of claim 1, wherein the attachment system comprises a protrusion and hole system.

7. The fire protection system of claim 6, wherein the protrusion and hole system includes:
    a first hole positioned at a first inner surface of the first fairing wall and a first protrusion attached to a first outer surface of the first fire blanket wall, the first protrusion configured to engage the first hole; and
    a second hole positioned at a second inner surface of the second fairing wall and a second protrusion attached to a second outer surface of the second fire blanket wall, the second protrusion configured to engage the second hole.

8. The fire protection system of claim 1, wherein the attachment system comprises a hook and hole system.

9. The fire protection system of claim 8, wherein the hook and hole system includes:
    a first hole positioned at a first inner surface of the first fairing wall and a first hook attached to a first outer surface of the first fire blanket wall, the first hook configured to engage the first hole; and a second hole positioned at a second inner surface of the second fairing wall and a second hook attached to a second outer surface of the second fire blanket wall, the second hook configured to engage the second hole.

10. The fire protection system of claim 9, wherein the first hole is a first vertical-hole or a first horizontal-hole and wherein the second hole is a second vertical-hole or a second horizontal-hole and wherein the first hook has a first pair of arms and the second hook has a second pair of arms.

11. A fire protection system for use with a heat exchanger within a nacelle of a gas turbine engine, comprising:
 a fairing having a first fairing wall and a second fairing wall;
 a fire blanket having a first end configured for attachment to the fairing and a second end configured for attachment to a duct interconnecting the fairing and the heat exchanger, the fire blanket having a first fire blanket wall and a second fire blanket wall, the first fire blanket wall configured for attachment with the first fairing wall of the fairing and the second fire blanket wall configured for attachment with the second fairing wall of the fairing;
 a bellows configured for disposition between the fairing and the fire blanket; and
 an attachment system configured to attach the first fire blanket wall to the first fairing wall and the second fire blanket wall to the second fairing wall,
  wherein the fairing, the bellows and the fire blanket, when assembled, are configured to establish a passage for the flow of a bypass stream of the gas turbine engine, from a forward facing end of the fairing, through the bellows, to an aft facing end of the fire blanket and
  wherein the passage is configured such that, during operation, the flow of the bypass stream flows through each of the fairing, the bellows and the fire blanket.

12. The fire protection system of claim 11, wherein the attachment system comprises a hook and loop system.

13. The fire protection system of claim 11, wherein the attachment system comprises a slot and wedge system.

14. The fire protection system of claim 11, wherein the attachment system comprises a protrusion and hole system.

15. The fire protection system of claim 11, wherein the attachment system comprises a hook and hole system.

16. A gas turbine engine, comprising: a nacelle defining a bypass flow path between a radially outer nacelle casing and a radially inner nacelle casing; a heat exchanger disposed within the bypass flow path; a fairing having a first fairing wall and a second fairing wall; a fire blanket disposed within the bypass flow path, the fire blanket having a first end configured for attachment to the fairing and a second end configured for attachment to a duct interconnecting the fairing and the heat exchanger, the fire blanket having a first fire blanket wall and a second fire blanket wall, the first fire blanket wall configured for attachment with the first fairing wall of the fairing and the second fire blanket wall configured for attachment with the second fairing wall of the fairing; a bellows configured for disposition between the fairing and the fire blanket; and an attachment system configured to attach the first fire blanket wall to the first fairing wall and the second fire blanket wall to the second fairing wall, wherein the fairing, the bellows and the fire blanket, when assembled, are configured to establish a passage for the flow of a bypass stream of the gas turbine engine, from a forward facing end of the fairing, through the bellows, to an aft facing end of the fire blanket and wherein the passage is configured such that, during operation, the flow of the bypass stream flows through each of the fairing, the bellows and the fire blanket.

17. The gas turbine engine of claim 16, wherein the attachment system comprises a hook and loop system.

18. The gas turbine engine of claim 16, wherein the attachment system comprises a slot and wedge system.

19. The gas turbine engine of claim 16, wherein the attachment system comprises a protrusion and hole system.

20. The gas turbine engine of claim 16, wherein the attachment system comprises a hook and hole system.

* * * * *